Patented Mar. 9, 1926.

1,576,408

UNITED STATES PATENT OFFICE.

HERMANN CAJAR, OF VIENNA, AUSTRIA.

PROCESS FOR THE MANUFACTURE OF PRINTING COLORS OR INK.

No Drawing.   Application filed December 5, 1923.   Serial No. 678,754.

*To all whom it may concern:*

Be it known that I, HERMANN CAJAR, a citizen of Germany, residing at Vienna, in the Republic of Austria, have invented certain new and useful Improvements in a Process for the Manufacture of Printing Colors or Ink, and for which I have filed an application for patent in Austria Sept. 22, 1922, of which the following is a specification.

The levigation with varnish of dry pigment colors for printing, manufactured by the wet process, presents in many cases great difficulties, as it is in a majority of cases impossible to ensure to said colors the same degree of fineness after drying as they possessed in the wet state. For the foregoing reason the manufacturers of printing colors or ink have been trying for a long time to combine the pressed or squeezed but still moist color-paste directly with varnish so as to get a perfectly fine end product. For this purpose the liquid paste and varnish, after having been thoroughly mixed, were passed through color grinding mills until complete evaporation of the water had ensued. At times these previously used grinding mills have been provided with heating means or devices to assist and complete the evaporation of the water. This prior method was however on the one hand very tedious and evaporation of water by the use of three high rolling mills commonly employed and provided with heating means incurred considerable expense, and on the other hand it was found impossible to remove by this operation all traces of water from the mixture, which is a serious drawback when such colors were to be mixed with other colors. A further disadvantage consists in the risk of formation of linoleates or resinates of aluminium, lead and other metal compounds, whereas in the finished product from which water has been fully evaporated, the formation of these metal compounds will not occur, or at least only very slowly. The whole of the water could be of course evaporated by heating to about 120° C., but at such a high temperature the printing colors or ink would strongly thicken, they would get the so-called "gummy" consistency which would render them perfectly useless for printing purposes.

The process according to the present invention provides for the complete separation of water from the mixture of the watery paste and the varnish at low temperatures. The improved process is highly economical and yields excellent fine products of advantageous consistency. The present process consists substantially in treating the mixture of the watery paste and the varnish in a mixing machine of the kind of Werner-Pfleiderer machines, and then in evaporating the water by the action of steam and vacuum which should be as high as possible (about 65 cm. vacuum). The process is completed in a few hours, and the color or ink discharged from the apparatus is at once ready for printing, provided there are no accidental impurities found therein.

*Example.*—174 kg. yellowlac forming a watery paste, dry contents 30%, consisting of aluminum hydroxide, blanc fixe, sulfon yellow R. conc. (Farbenfarbiken vorm. Friedr. Bayer & Co.) in the form of its barium salt, and 47 kg. thin linseed-oil varnish are stirred for half-an-hour in a steam-jacketed mixing machine connected to a vacuum pump, then after opening the steam valve and discharging, the water is evaporated. The process requires about 4 working hours and yields 100 kg. of color or ink ready for use on the offset press. The quantity of water evaporated amounts to 121 kg.

What I claim is:

1. The process of manufacturing colored printing ink, consisting in subjecting an ink composition of a watery paste character to the action of steam jacketed mixing and levigating mechanism connected to a vacuum-creating source, and then evaporating the water from the composition by the action of steam and a relatively high vacuum of about 65 cm.

2. The process of manufacturing colored printing ink for use on paper, consisting in subjecting a watery paste and varnish ink composition to the action of a steam jacketed mixing machine at a low temperature, and then expelling and evaporating the water from the composition by the action of steam and a relatively high vacuum of about 65 cm.

In testimony whereof I have signed my name to this specification.

DR. HERMANN CAJAR.